(No Model.)
H. F. DAMMON.
Bird Cage Perch.
No. 241,940. Patented May 24, 1881.
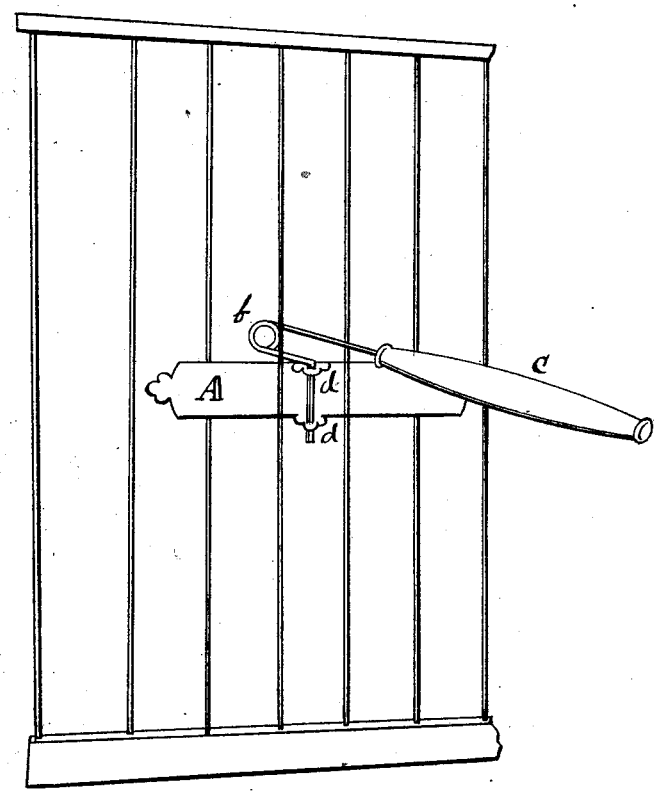
Witnesses
E. R. Gardner
Wm Brown
Inventor
Harrison F. Dammon
by H. W. Mason Atty.

UNITED STATES PATENT OFFICE.

HARRISON F. DAMMON, OF NEW BEDFORD, MASSACHUSETTS.

BIRD-CAGE PERCH.

SPECIFICATION forming part of Letters Patent No. 241,940, dated May 24, 1881.

Application filed March 16, 1881. (No model.)

*To all whom it may concern:*

Be it known that I, HARRISON F. DAMMON, a citizen of the United States, residing at New Bedford, in the county of Bristol and State of Massachusetts, have invented a new and useful Improvement in Perches for Bird-Cages, of which the following is a specification.

My invention relates to improvements in perches for bird-cages, and the object of my invention is to provide a perch which will be, in its elasticity and movement, as near as possible like the natural twig or bough. I attain this object by the device illustrated in the accompanying drawing, in which is seen a view in perspective of the device properly adjusted to a section of a bird-cage.

The plate A is furnished with the projections $d\,d$, which projections are perforated to receive the perpendicular portion of the spring $b$. By connecting the spring-perch with the plate in this way the perch can be readily detached, so that it can be conveniently cleaned. The other end of the spring $b$ enters a perforation in the end of the perch $c$, whereby the perch $c$ is held in a horizontal position.

To prevent the lateral motion of the perch $c$ other than that allowed by the elasticity of the spring $b$, both the perpendicular portion of the spring $b$ and the perforations in the projections $d\,d$ are made square.

The plate A may be inserted in the wires of the cage at any point desired. The spring $b$, with the perch $c$ attached, being then adjusted, as shown, the device is ready for use and the perch has the elasticity and movement of the natural twig.

Prior to my invention a bird-cage has been provided with a spring-perch composed of a bar provided at one end with a coiled spring soldered to a plate, said plate being detachably secured to the cage by spring-fingers, thus requiring the cage to be constructed so as to provide supports for the plate.

What I claim as my invention, and desire to secure by Letters Patent, is—

The combination, with a bird-cage, of the plate A, having projections $d$ formed with square perforations, the perch $c$, and the spring $b$, secured to said perch and provided with a vertical extension passing through the perforated projection upon the plate, as shown, the said spring being detachably connected with said plate, for the purpose specified.

HARRISON F. DAMMON.

Witnesses:
F. A. MILLIKEN,
H. W. MASON.